(12) United States Patent
Wang et al.

(10) Patent No.: US 11,447,992 B2
(45) Date of Patent: Sep. 20, 2022

(54) PIVOT DEVICE WITH AN INTERLOCKING LIFTING MECHANISM

(71) Applicant: Leohab Enterprise Co., Ltd., Taichung (TW)

(72) Inventors: Chun Ti Wang, Taichung (TW); Fu Chun Chung, Taichung (TW); Yu Ting Ting, Taichung (TW)

(73) Assignee: Leohab Enterprise Co., Ltd., Taichung (TW)

( * ) Notice: Subject to any disclaimer, the term of this patent is extended or adjusted under 35 U.S.C. 154(b) by 59 days.

(21) Appl. No.: 17/152,914

(22) Filed: Jan. 20, 2021

(65) Prior Publication Data

US 2022/0228409 A1  Jul. 21, 2022

(51) Int. Cl.
  *E05D 3/14* (2006.01)
  *G06F 1/16* (2006.01)
  *E05D 3/18* (2006.01)

(52) U.S. Cl.
  CPC ............. *E05D 3/14* (2013.01); *E05D 3/18* (2013.01); *G06F 1/1681* (2013.01); *E05Y 2201/638* (2013.01); *E05Y 2900/606* (2013.01)

(58) Field of Classification Search
  CPC ....... E05D 3/14; E05D 3/18; E05Y 2201/638; E05Y 2900/606; G06F 1/1681; G06F 1/1616; G06F 1/1626
  See application file for complete search history.

(56) References Cited

U.S. PATENT DOCUMENTS

| | | | | |
|---|---|---|---|---|
| 9,069,528 B2* | 6/2015 | Hsu | ...................... | G06F 1/1637 |
| 9,094,490 B2* | 7/2015 | Sayama | .............. | H04M 1/0216 |
| 9,137,907 B2* | 9/2015 | Sun | ........................ | G06F 1/1681 |
| 9,189,032 B2* | 11/2015 | Jheng | .................... | G06F 1/1681 |
| 9,304,553 B2* | 4/2016 | Park | ........................ | G06F 1/1681 |
| 9,404,298 B1* | 8/2016 | Chen | ...................... | G06F 1/1681 |
| 9,784,406 B1* | 10/2017 | Lin | .......................... | G06F 1/166 |
| 9,797,546 B1* | 10/2017 | Lin | ........................ | F16M 13/00 |
| 9,834,965 B1* | 12/2017 | Yao | ....................... | H05K 5/0234 |
| 9,939,851 B2* | 4/2018 | Lan | ........................ | F16M 11/10 |
| 10,028,398 B1* | 7/2018 | Lin | ........................ | F16M 13/00 |
| 10,459,482 B2* | 10/2019 | McDermid | ............. | G09F 9/301 |
| 10,465,427 B2* | 11/2019 | Chen | ........................ | E05D 3/18 |

(Continued)

*Primary Examiner* — Victor D Batson
*Assistant Examiner* — Matthew J Sullivan
(74) *Attorney, Agent, or Firm* — Alan D. Kamrath; Karin L. Williams; Mayer & Williams PC (57) ABSTRACT

A pivot device with an interlocking lifting mechanism includes a first interlocking member to which first and second shafts and a second interlocking member are pivotably connected. A torque device is mounted around the first and second shafts. A third interlocking member is pivotably connected to the second interlocking member and includes a sliding groove. A fixing seat includes a pivotal member extending through the sliding groove. The second interlocking member is slidably received in a guiding groove of the guiding seat. When the first shaft pivots through a certain angle, the first interlocking member pivots about the second shaft and actuates the second interlocking member. The third interlocking member pivots relative to the fixing seat. The sliding groove slides relative to the pivotal member. The second distal end synchronously slides relative to the first guiding groove to lift an auxiliary screen unit connected to the third proximal end.

7 Claims, 8 Drawing Sheets

(56) References Cited

U.S. PATENT DOCUMENTS

| | | | | |
|---|---|---|---|---|
| 10,470,323 | B2* | 11/2019 | Cheng | G06F 1/1681 |
| 10,772,224 | B2* | 9/2020 | Lan | G06F 1/1616 |
| 10,837,209 | B2* | 11/2020 | Lin | G06F 1/1616 |
| 11,009,061 | B2* | 5/2021 | Chang | E05D 11/06 |
| 11,016,528 | B2* | 5/2021 | Lin | G06F 1/1616 |
| 11,136,806 | B2* | 10/2021 | Kuramochi | E05F 3/221 |
| 11,163,344 | B2* | 11/2021 | Huang | G06F 1/1681 |
| 2013/0021722 | A1* | 1/2013 | Guo | G06F 1/1624 |
| | | | | 361/679.01 |
| 2013/0061700 | A1* | 3/2013 | Mitsui | H04M 1/0237 |
| | | | | 74/105 |
| 2017/0208703 | A1* | 7/2017 | Lin | H05K 7/16 |
| 2017/0344067 | A1* | 11/2017 | Lan | F16C 11/04 |
| 2022/0011827 | A1* | 1/2022 | Kim | G06F 1/1652 |
| 2022/0121245 | A1* | 4/2022 | Huang | G06F 1/1652 |

* cited by examiner

PIVOT DEVICE WITH AN INTERLOCKING LIFTING MECHANISM

BACKGROUND OF THE INVENTION

The present invention relates to a pivot device and, more particularly, to a pivot device with an interlocking lifting mechanism.

General foldable electronic devices, such as notebook computers, include a mainframe unit and a main screen unit which can be closed by using a pivot. Such foldable electronic computers can only show information on the main screen unit, and the amount of information is limited in some applications. Another type of currently available foldable electronic device includes an auxiliary screen unit disposed on the mainframe unit. More information can be displayed on the main screen unit and the auxiliary screen unit, and the auxiliary screen unit provides additional touch control. However, the auxiliary screen unit simply and flatly disposed on the mainframe unit cannot provide a good view for the user, which not only adversely affects the image quality but also fails to permit the user to receive all information on the main screen unit and the auxiliary screen unit in real time. Also, the accuracy of touch control on the auxiliary screen unit is adversely affected.

BRIEF SUMMARY OF THE INVENTION

The present invention provides a pivot device with an interlocking lifting mechanism, comprising a first interlocking member including a first distal end, a first proximal end, and a first pivotal portion between the first distal end and the first proximal end. A first shaft is pivotably connected to the first distal end. A second shaft is pivotably connected to the first pivotal portion. A torque device is mounted around the first shaft and the second shaft. A second interlocking member includes a second distal end and a second proximal end pivotably connected to the first proximal end. A third interlocking member includes a third distal end, a third proximal end pivotably connected to the second distal end, and a sliding groove at the third proximal end. A fixing seat includes a second pivotal portion and a pivotal member extending through the sliding groove and the second pivotal portion. At least one first guiding seat includes a first guiding groove. The second distal end is slidably received in the first guiding groove. When the first shaft pivots through a certain angle, the first interlocking member pivots about the second shaft and actuates the second interlocking member. The third interlocking member is actuated by the second interlocking member to pivot relative to the fixing seat. The sliding groove slides relative to the pivotal member. The second distal end synchronously slides relative to the first guiding groove to lift the third proximal end.

In an example, the third interlocking member includes a connecting plate pivotably connected to the third distal end.

In an example, the pivot device further comprises a second guiding seat having a second guiding groove and a sliding member slidably received in the second guiding groove.

In an example, the second interlocking member includes a sliding portion at the second distal end. The first guiding groove includes a rectilinear section and an arcuate section connected to the rectilinear section. The sliding portion slides from the rectilinear section to the arcuate section in response to movement of the second distal end relative to the first guiding groove.

In an example, the torque device includes a cam unit and a torque member unit. The cam unit includes a first cam mounted around the first shaft, a second cam mounted around the second shaft, and a stop block mounted between the first cam and the second cam. The torque member unit is disposed on a distal end of the first shaft and a distal end of the second shaft.

In an example, the torque device further includes a casing. The cam unit and the torque member unit are received in the casing. The cross sectional shape of the casing corresponds to the cross sectional shape of the first interlocking member. The first interlocking member is connected to the casing and closes a side of the casing.

In an example, the fixing seat further includes a fixing plate having a notch. The at least one guiding seat is connected to the fixing plate. The third interlocking member is aligned with the notch.

According to the above, in the pivot device with the interlocking lifting mechanism of the embodiment according to the present invention, by simply opening the main screen unit, the first interlocking member actuates the second interlocking member, and the third interlocking member is actuated by the second interlocking member to pivot relative to the fixing seat, thereby synchronously lifting the auxiliary screen unit connected to the connecting plate.

The present invention will become clearer in light of the following detailed description of illustrative embodiments of this invention described in connection with the drawings.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "proximal", "distal", "side", "end", "portion", "section", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 1:
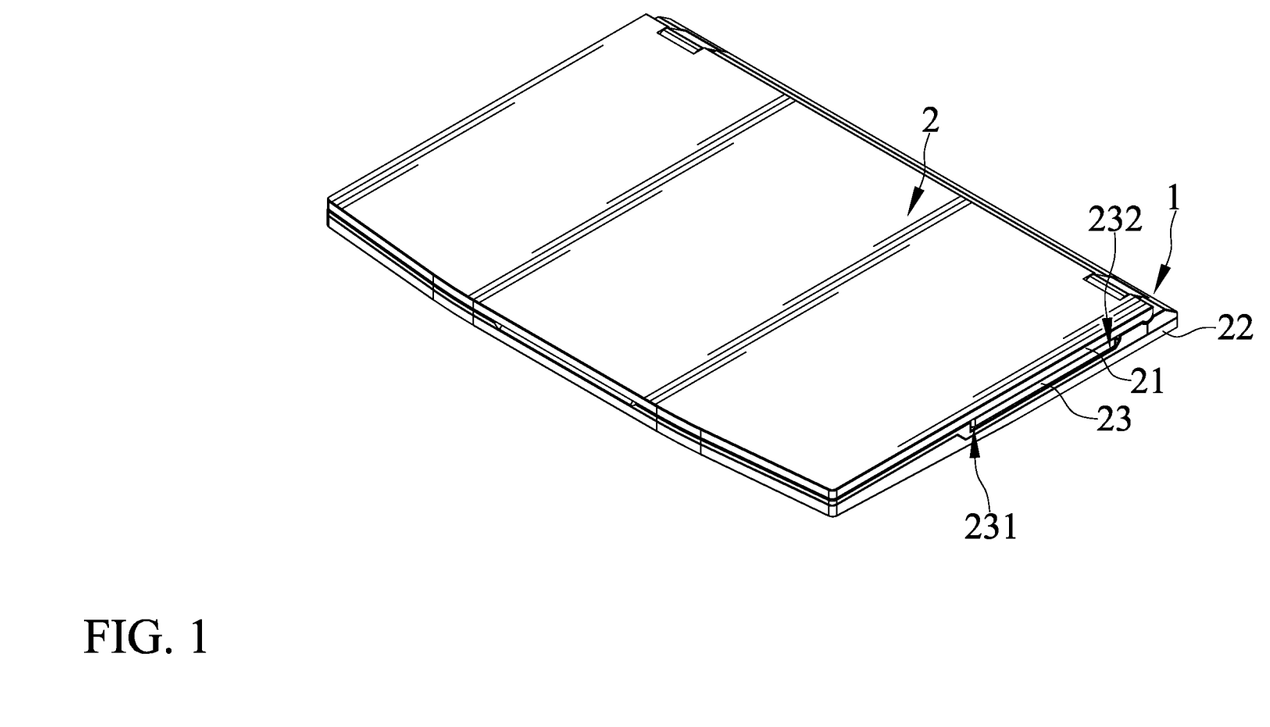
FIG. 1 is a perspective view of a pivot device with an interlocking lifting mechanism of an embodiment according to the present invention used on a foldable electronic device in a closed position.
Figure 2:
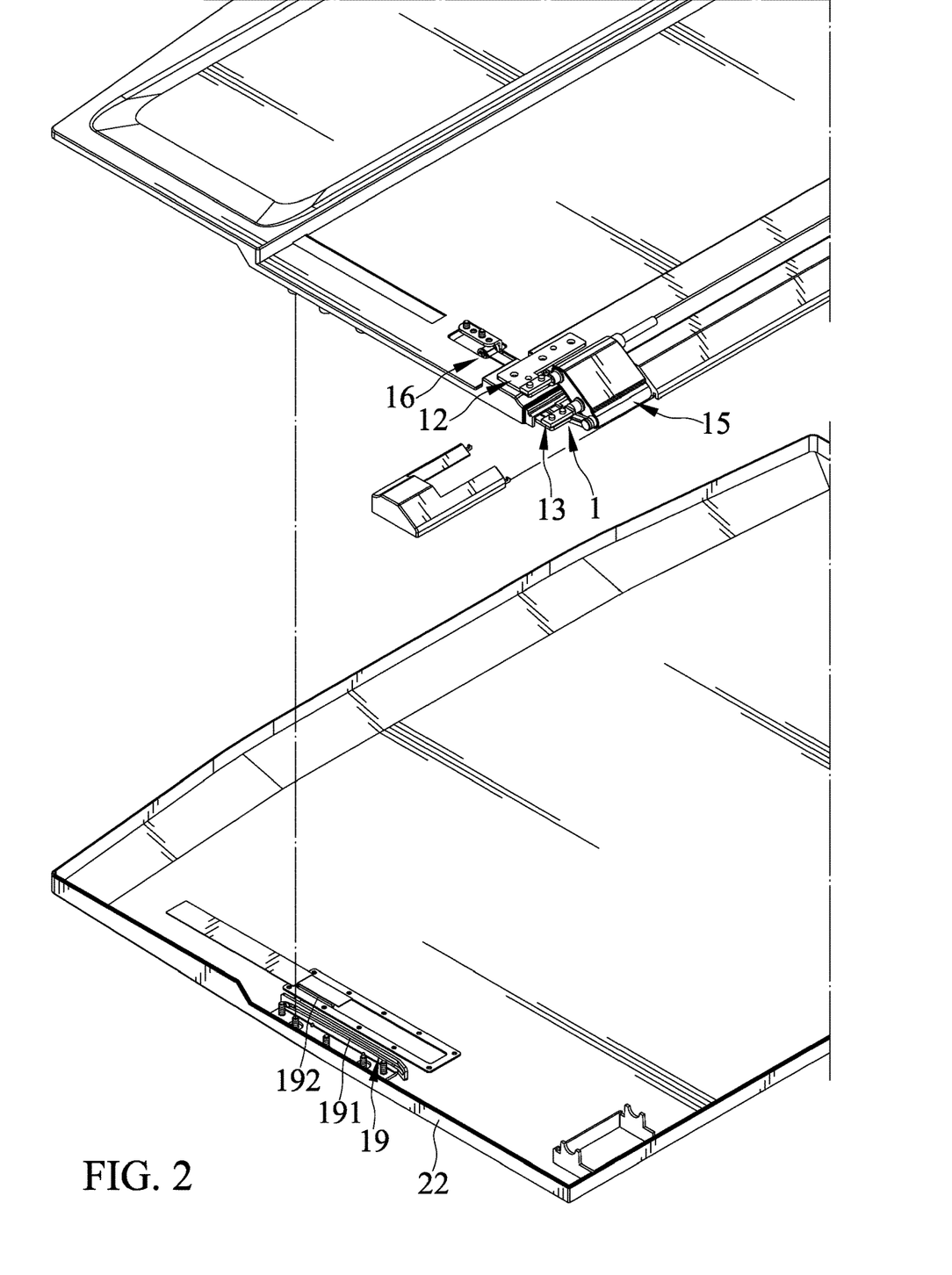
FIG. 2 is an exploded, perspective view of a portion of FIG. 1.
Figure 3:
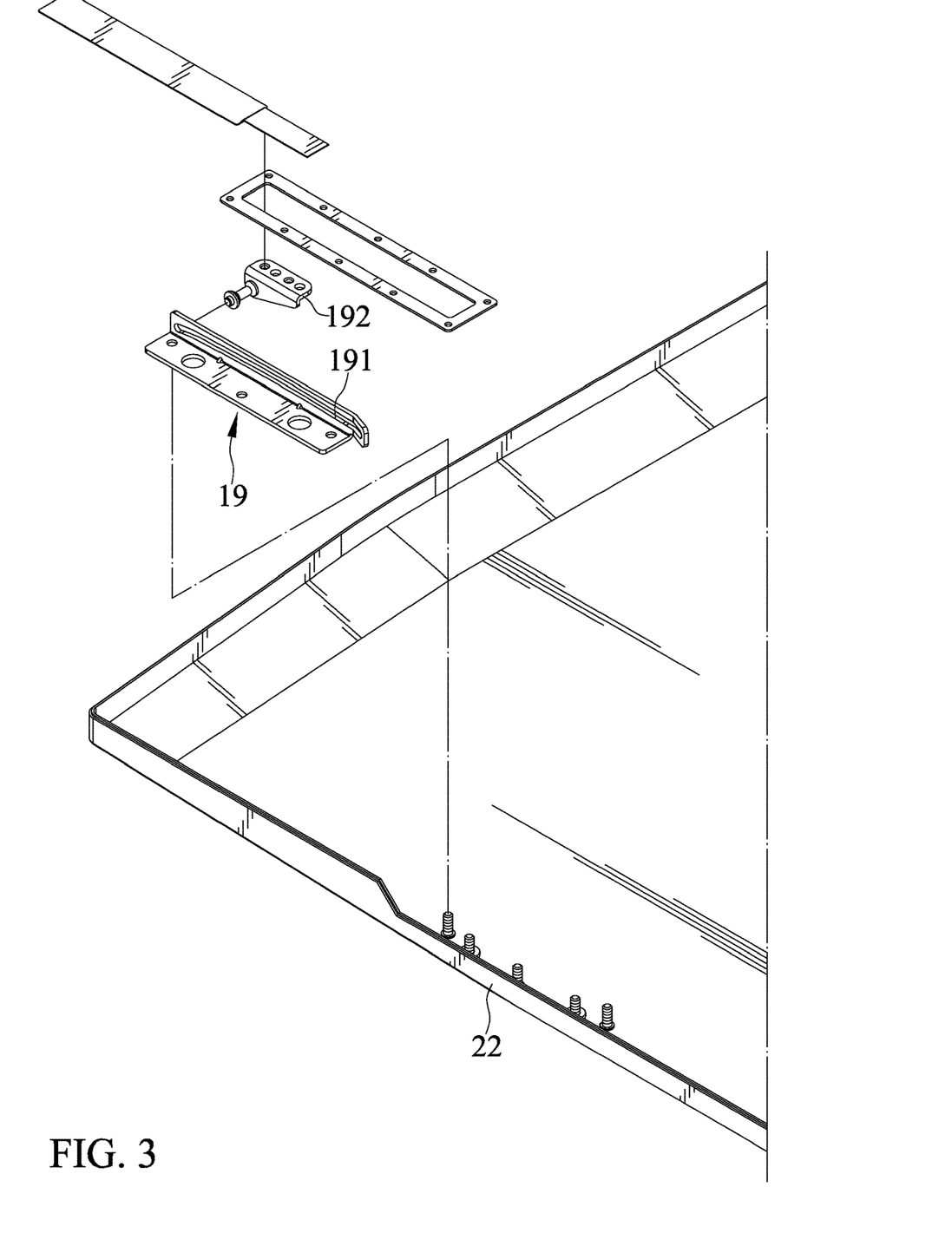
FIG. 3 is an exploded, perspective view of another portion of FIG. 1.

FIGS. 1-3 are diagrammatic views showing a pivot device 1 with an interlocking lifting mechanism of an embodiment according to the present invention which can be used on a foldable electronic device 2. In this embodiment, the foldable electronic device 2 includes a main screen unit 21, a main frame unit 22 pivotably connected to the main screen unit 21 by the pivot device 1, and an auxiliary screen unit 23 that is lifted synchronously by the pivot device 1 while the main screen unit 21 pivots relative to the mainframe unit 22. The auxiliary screen unit 23 includes a distal end 231 distant to the pivot device 1 and a proximal end 232 opposite to the distal end 231.

Figure 4:
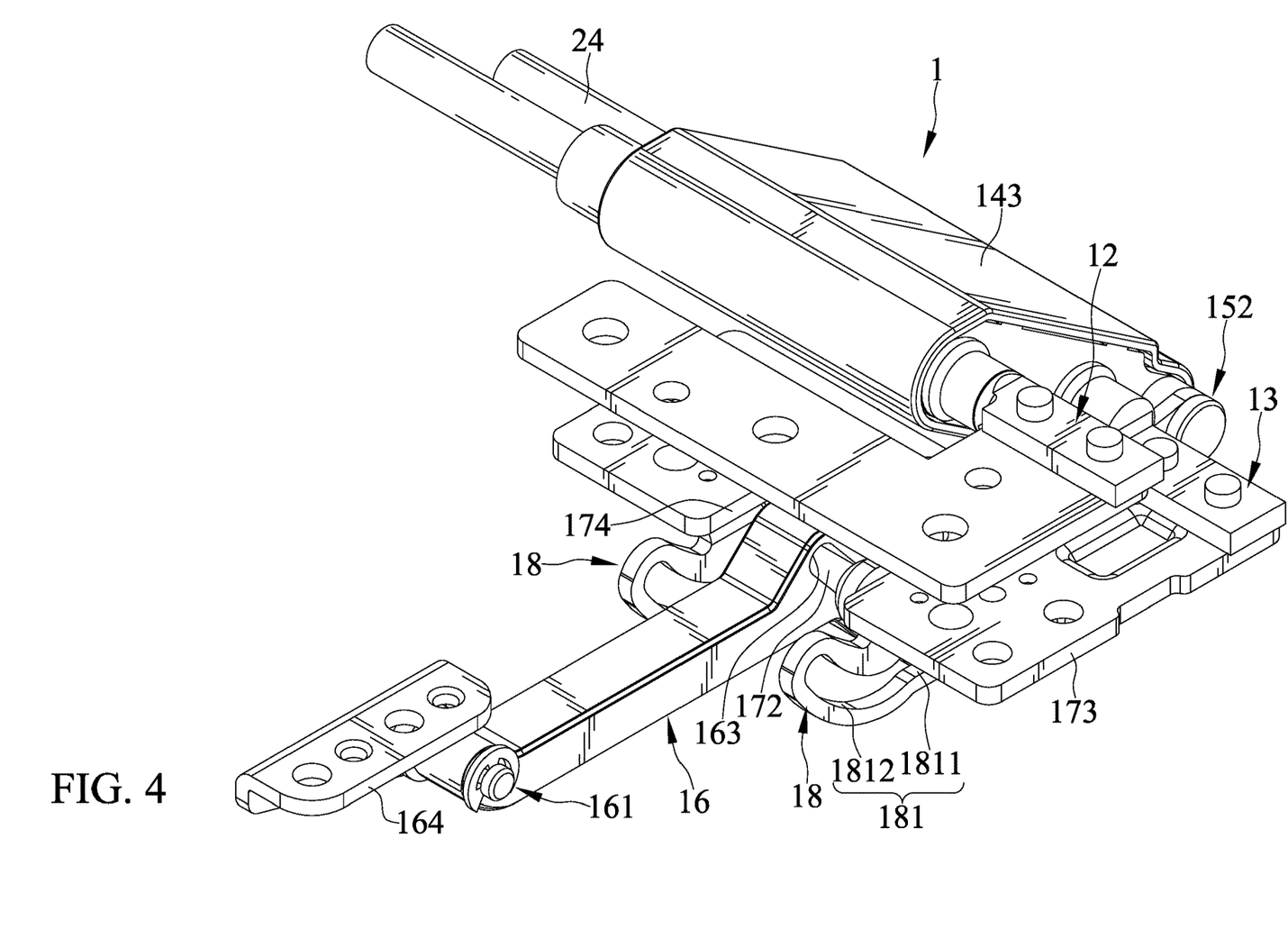
FIG. 4 is a perspective view of the pivot device of FIG. 1.
Figure 5:
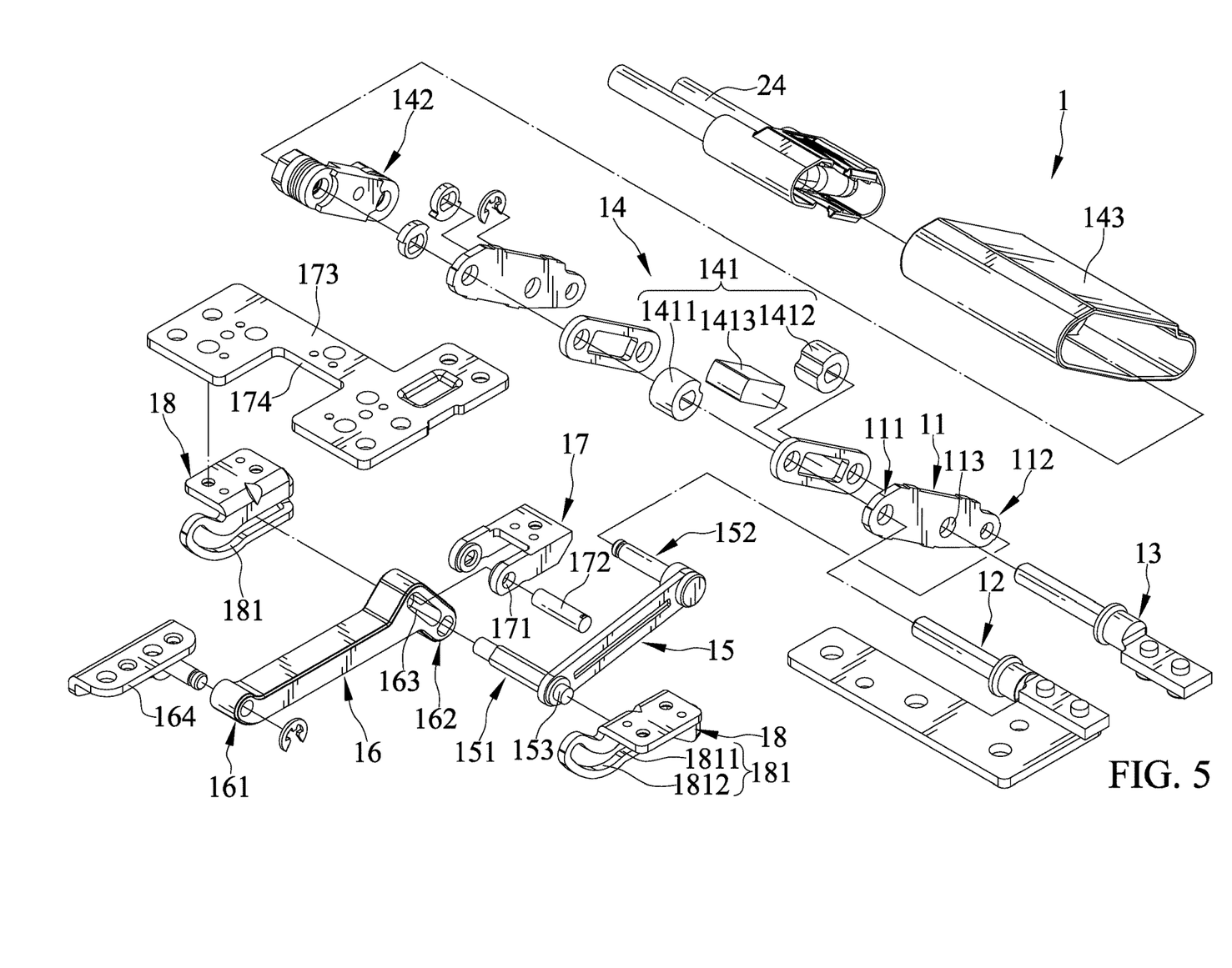
FIG. 5 is an exploded, perspective view of the pivot device of FIG. 4.

With reference to FIGS. 4 and 5, the pivot device 1 with the interlocking mechanism of this embodiment comprises a first interlocking member 11, a first shaft 12, a second shaft 13, a torque device 14, a second interlocking member 15, a third interlocking member 16, a fixing seat 17, and at least one first guiding seat 18. The first interlocking member 11 includes a first distal end 111, a first proximal end 112, and a first pivotal portion 113 between the first distal end 111 and the first proximal end 112. The first shaft 12 is pivotably connected to the first distal end 111 of the first interlocking member 11. The second shaft 13 is pivotably connected to the first pivotal portion 113 and is configured to connect with the mainframe unit 22. The torque device 14 is mounted around the first shaft 12 and the second shaft 13. The second interlocking member 15 includes a second distal end 151 and a second proximal end 152 pivotably connected to the first proximal end 112 of the first interlocking member 11. The third interlocking member 16 includes a third distal end 161 configured to connect with the proximal end 232 of the auxiliary screen unit 23, a third proximal end 162 pivotably connected to the second distal end 151 of the second interlocking member 15, and a sliding groove 163 at the third proximal end 162. The fixing seat 17 includes a second pivotal portion 171 and a pivotal member 172 extending through the sliding groove 163 of the third interlocking member 16 and the second pivotal portion 171. The at least one first guiding seat 18 includes a first guiding groove 181. The second distal end 151 of the second interlocking member 15 is slidably received in the first guiding groove 181.

In this embodiment, the torque device 14 includes a cam unit 141 and a torque member unit 142. The cam unit 141 includes a first cam 1411 mounted around the first shaft 12, a second cam 1412 mounted around the second shaft 13, and a stop block 1413 mounted between the first cam 1411 and the second cam 1412. The torque member unit 142 is disposed on a distal end of the first shaft 12 and a distal end of the second shaft 13. The torque member unit 142 can be a conventional member for generating a torque, such as a spring, a resilient plate, etc. Detailed description is not given herein to avoid redundancy.

Furthermore, the torque device 14 includes a casing 143. The cam unit 141 and the torque member unit 142 are received in the casing 143. The cross sectional shape of the casing 143 corresponds to the cross sectional shape of the first interlocking member 11. The first interlocking member 11 is connected to the casing 143 and closes a side of the casing 143. Thus, the casing 143 can avoid exposure of the cam unit 141 and the torque member unit 142 and can receive wires 24 of the foldable electronic device 2.

To permit connection of the third distal end 161 of the third interlocking member 16 to the auxiliary screen unit 23, the interlocking member 16 further includes a connecting plate 164 pivotably connected to the third distal end 161. The connecting plate 164 is configured to couple with the auxiliary screen unit 23. Furthermore, to permit sliding movement of the second distal end 151 of the second interlocking member 15 in the first guiding groove 181, the second interlocking member 15 includes a sliding portion 153 at the second distal end 151. The first guiding groove 181 includes a rectilinear section 1811 and an arcuate section 1812 connected to the rectilinear section 1811. The sliding portion 153 slides from the rectilinear section 1811 to the arcuate section 1812 in response to movement of the second distal end 151 of the second interlocking member 15 relative to the first guiding groove 181.

Furthermore, in this embodiment, the pivot device 1 includes two first guiding seats 18 on two opposite sides of the third interlocking member 16, respectively. The fixing seat 17 further includes a fixing plate 173 having a notch 174. The two first guiding seats 18 are connected to the fixing plate 173. The third interlocking member 16 is aligned with the notch 174.

The pivot device 1 can further comprise a second guiding seat 19 configured to connect with the mainframe unit 22. The second guiding seat 19 includes a second guiding groove 191, and a sliding member 192 is slidably received in the second guiding groove 191. The sliding member 192 is configured to connect with the distal end 231 of the auxiliary screen unit 23.

Figure 6:
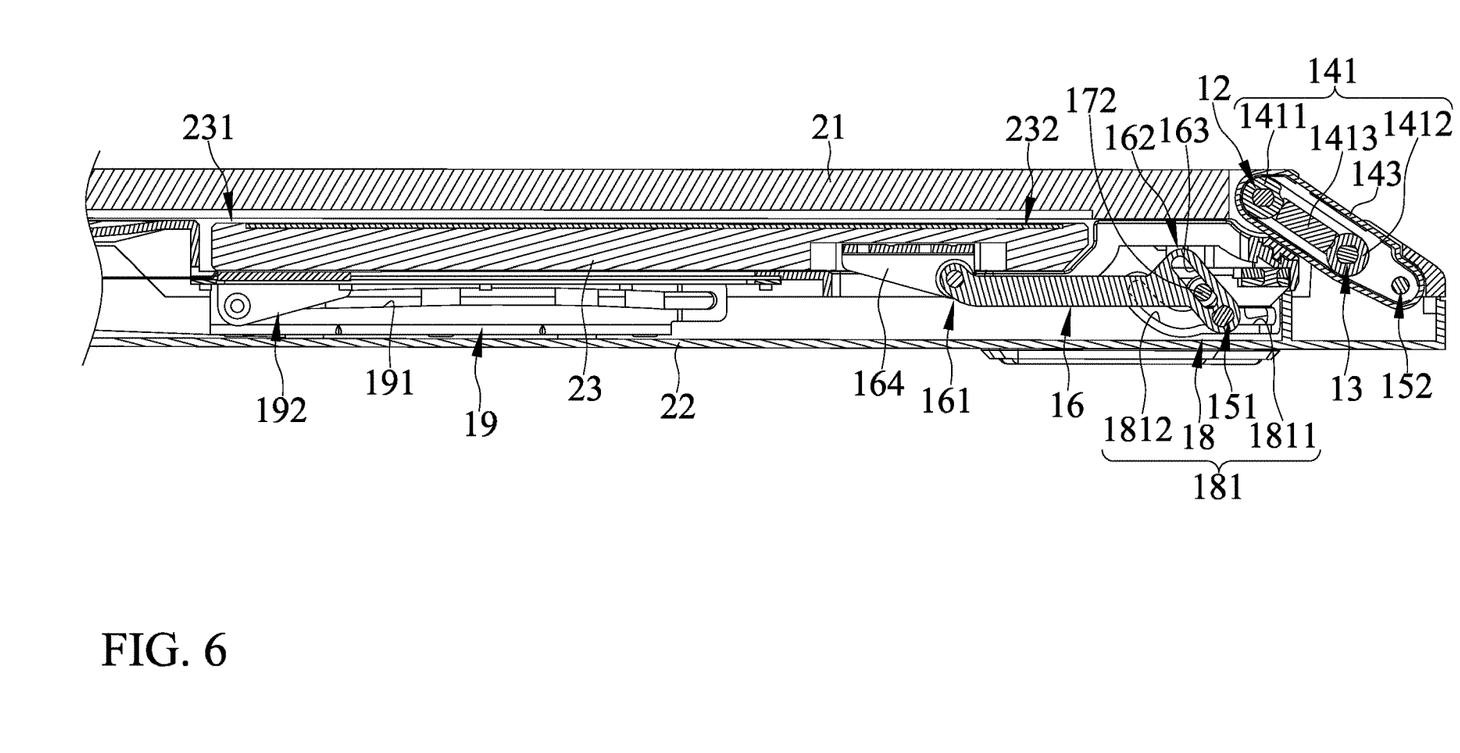
FIG. 6 is a cross sectional view of the pivot device of FIG. 4 used on a foldable electronic device in a closed position.
Figure 7:
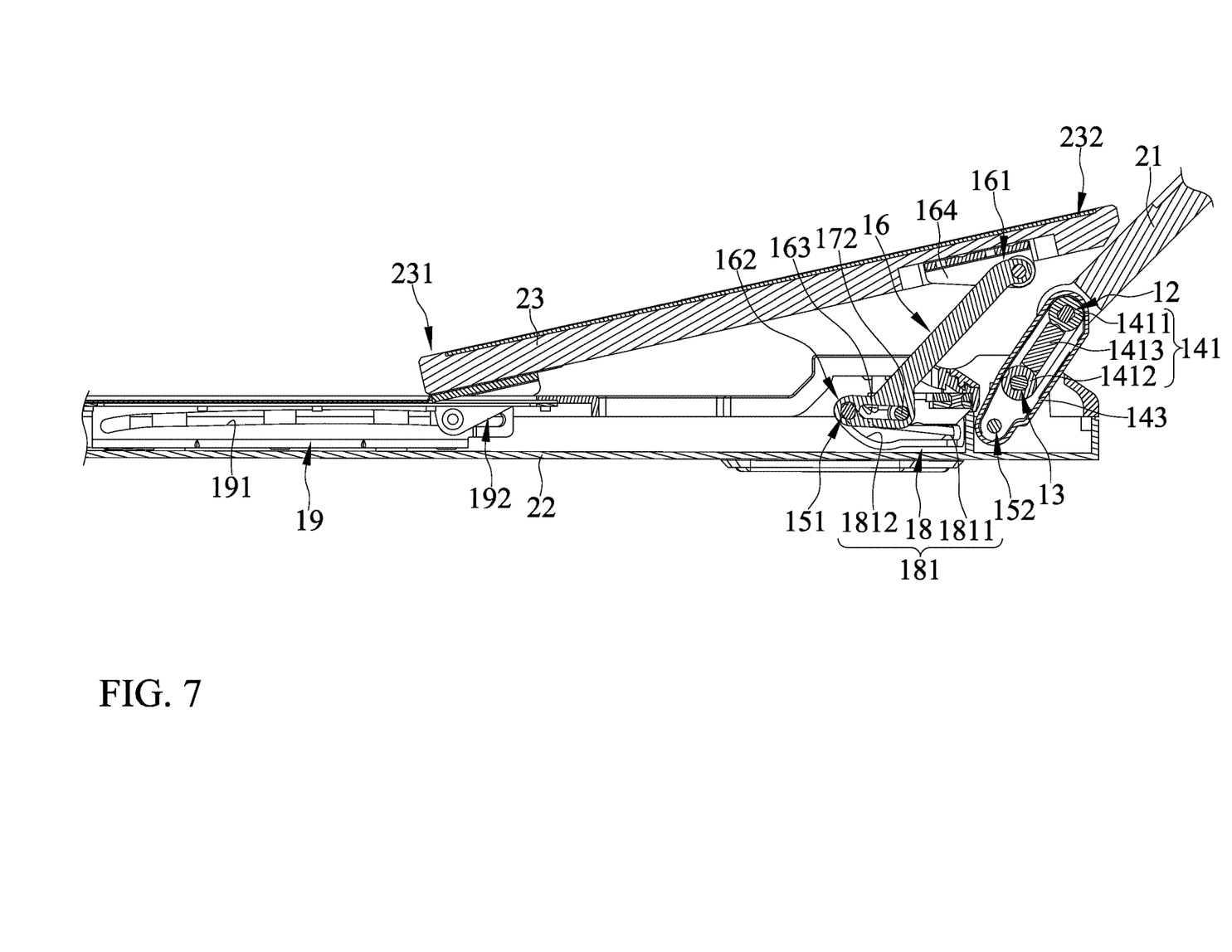
FIG. 7 is a cross sectional view similar to FIG. 6 with the foldable electronic device moved from the closed position to an open position.
Figure 8:
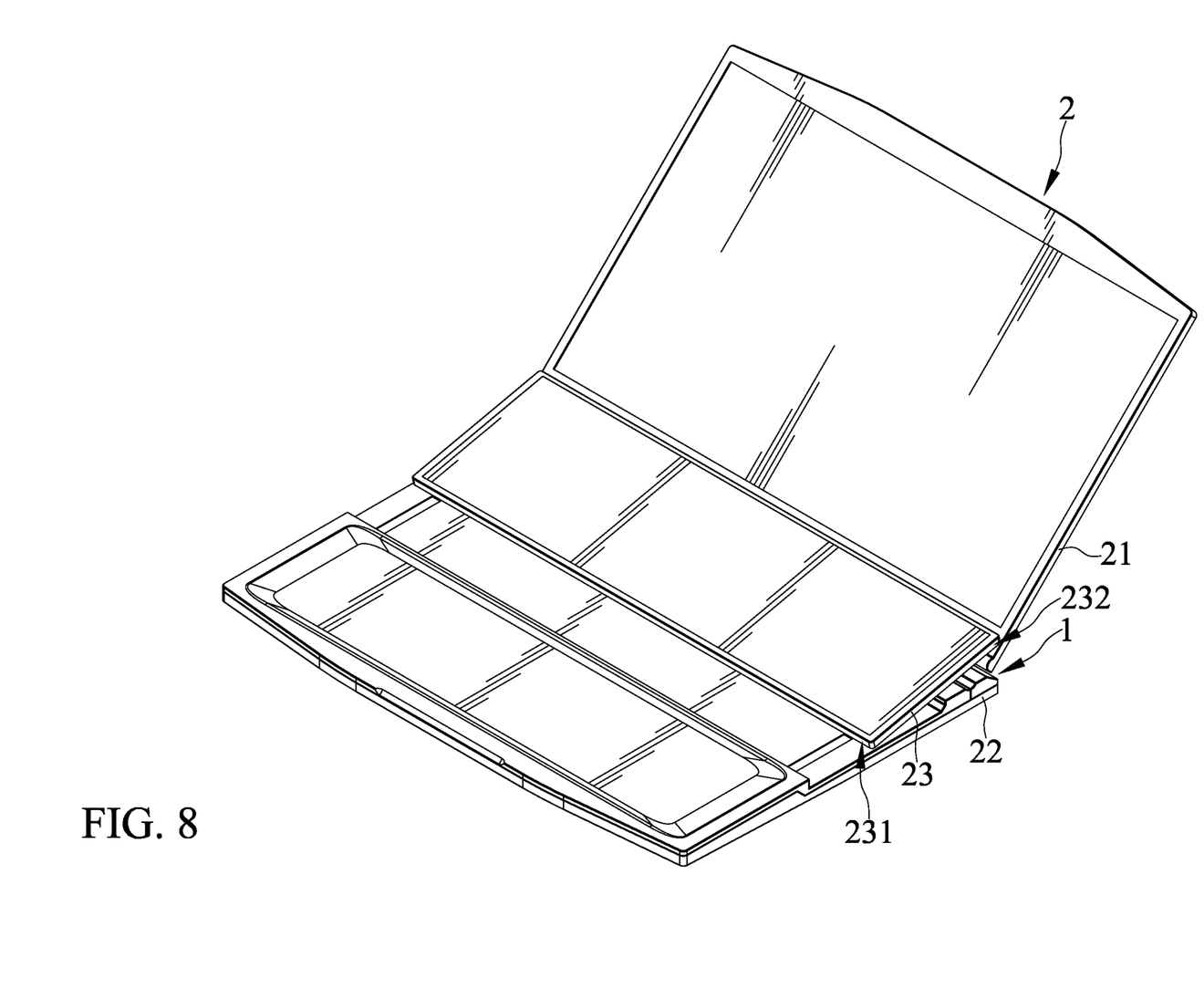
FIG. 8 is a perspective view similar to FIG. 4 with the foldable electronic device moved to an open position.

FIGS. 6-8 show movement of the foldable electronic device 2 from a closed position to an open position. When the foldable electronic device 2 is in the closed position, the main screen unit 21, the mainframe unit 22, and the auxiliary screen unit 23 are substantially parallel to each other. The sliding portion 153 of the second interlocking member 15 is located in the rectilinear section 1811 of the first guiding groove 181 of the at least one first guiding seat 18. The third interlocking member 16 is substantially parallel to the auxiliary screen unit 23.

When a user applies a force to open the main screen unit 21 until the first shaft 12 pivots through a certain angle to a certain angular position stopped by the stop block 1413, the first interlocking member 11 pivots relative to the mainframe unit 22 about the second shaft 13 and actuates the second interlocking member 15. The third interlocking member 16 is actuated by the second interlocking member 15 to pivot relative to the fixing seat 17. The sliding groove 163 slides relative to the pivotal member 172. The second distal end 151 synchronously slides relative to the first guiding groove 181, such that the sliding portion 153 moves from the rectilinear section 1811 to the arcuate section 1812 of the first guiding groove 181 to lift the third distal end 161 of the third interlocking member 16, thereby lifting the auxiliary screen unit 23 connected to the connecting plate 164. Thus, the auxiliary screen unit 23 and the mainframe unit 22 have an inclination angle therebetween, and the proximal end 232 of the auxiliary screen unit 23 is near the main screen unit 21. Furthermore, the sliding member 192 slides relative to the second guiding groove 191, such that the distal end 231 of the auxiliary screen unit 23 connected to the sliding member 192 slides rectilinearly relative to the second guiding seat 19.

In view of the above, in the pivot device 1 with the interlocking lifting mechanism of the embodiment according to the present invention, by simply opening the main screen unit 21, the first interlocking member 11 actuates the second interlocking member 15, and the third interlocking member 16 is actuated by the second interlocking member 15 to pivot relative to the fixing seat 17, thereby synchronously lifting the auxiliary screen unit 23 connected to the connecting plate 164. Furthermore, the proximal end 232 of the auxiliary screen unit 23 is near the main screen unit 21, and the distal end 231 of the auxiliary screen unit 23 connected to the sliding member 192 slides rectilinearly relative to the second guiding seat 19. Thus, the gap between the main screen unit 21 and the auxiliary screen unit 23 of the foldable electronic device 2 in the open position is reduced.

Although specific embodiments have been illustrated and described, numerous modifications and variations are still possible without departing from the scope of the invention. The scope of the invention is limited by the accompanying claims.

The invention claimed is:

1. A pivot device with an interlocking lifting mechanism, comprising:
   a first interlocking member including a first distal end, a first proximal end, and a first pivotal portion between the first distal end and the first proximal end;
   a first shaft pivotably connected to the first distal end;
   a second shaft pivotably connected to the first pivotal portion;
   a torque device mounted around the first shaft and the second shaft;
   a second interlocking member including a second distal end and a second proximal end pivotably connected to the first proximal end;
   a third interlocking member including a third distal end, a third proximal end pivotably connected to the second distal end, and a sliding groove at the third proximal end;
   a fixing seat including a second pivotal portion and a pivotal member extending through the sliding groove and the second pivotal portion;
   at least one first guiding seat including a first guiding groove, wherein the second distal end is slidably received in the first guiding groove,
   wherein when the first shaft pivots through a certain angle, the first interlocking member pivots about the second shaft and actuates the second interlocking member, wherein the third interlocking member is actuated by the second interlocking member to pivot relative to the fixing seat, wherein the sliding groove slides relative to the pivotal member, and wherein the second distal end synchronously slides relative to the first guiding groove to lift the third distal end.

2. The pivot device with the interlocking lifting mechanism as claimed in claim 1, wherein the third interlocking member includes a connecting plate pivotably connected to the third distal end.

3. The pivot device with the interlocking lifting mechanism as claimed in claim 1, further comprising a second guiding seat having a second guiding groove and a sliding member slidably received in the second guiding groove.

4. The pivot device with the interlocking lifting mechanism as claimed in claim 1, wherein the second interlocking member includes a sliding portion at the second distal end, wherein the first guiding groove includes a rectilinear section and an arcuate section connected to the rectilinear section, wherein the sliding portion slides from the rectilinear section to the arcuate section in response to movement of the second distal end relative to the first guiding groove.

5. The pivot device with the interlocking lifting mechanism as claimed in claim 1, wherein the torque device includes a cam unit and a torque member unit, wherein the cam unit includes a first cam mounted around the first shaft, a second cam mounted around the second shaft, and a stop block mounted between the first cam and the second cam, and wherein the torque member unit is disposed on a distal end of the first shaft and a distal end of the second shaft.

6. The pivot device with the interlocking lifting mechanism as claimed in claim 5, wherein the torque device further includes a casing, wherein the cam unit and the torque member unit are received in the casing, wherein a cross sectional shape of the casing corresponds to a cross sectional shape of the first interlocking member, and wherein the first interlocking member is connected to the casing and closes a side of the casing.

7. The pivot device with the interlocking lifting mechanism as claimed in claim 1, wherein the fixing seat further includes a fixing plate having a notch, wherein the at least one guiding seat is connected to the fixing plate, and wherein the third interlocking member is aligned with the notch.

* * * * *